(12) United States Patent
Liu et al.

(10) Patent No.: US 7,634,476 B2
(45) Date of Patent: Dec. 15, 2009

(54) RANKING OF WEB SITES BY AGGREGATING WEB PAGE RANKS

(75) Inventors: Tie-Yan Liu, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/459,869

(22) Filed: Jul. 25, 2006

(65) Prior Publication Data
US 2008/0027936 A1 Jan. 31, 2008

(51) Int. Cl.
*G06F 17/00* (2006.01)
(52) U.S. Cl. .............................................. 707/7; 707/3
(58) Field of Classification Search ............... 707/1–10, 707/104.1
See application file for complete search history.

(56) References Cited

U.S. PATENT DOCUMENTS

| | | | |
|---|---|---|---|
| 5,940,821 A | 8/1999 | Wical | |
| 6,363,378 B1 | 3/2002 | Conklin et al. | |
| 6,738,678 B1 | 5/2004 | Bharat et al. | |
| 6,871,202 B2 | 3/2005 | Broder | |
| 7,028,029 B2 | 4/2006 | Kamvar et al. | |
| 7,580,931 B2 | 8/2009 | Liu et al. | |
| 2003/0037074 A1 | 2/2003 | Dwork et al. | |
| 2003/0204502 A1* | 10/2003 | Tomlin et al. | 707/5 |
| 2004/0064438 A1* | 4/2004 | Kostoff | 707/1 |
| 2004/0267722 A1 | 12/2004 | Larimore et al. | |
| 2005/0060297 A1 | 3/2005 | Najork | |
| 2005/0071465 A1 | 3/2005 | Zeng et al. | |
| 2005/0165766 A1* | 7/2005 | Szabo | 707/3 |
| 2005/0256860 A1* | 11/2005 | Eiron et al. | 707/4 |
| 2006/0004809 A1 | 1/2006 | Zhang et al. | |
| 2006/0095416 A1* | 5/2006 | Barkhin et al. | 707/3 |
| 2006/0179046 A1* | 8/2006 | Rajaraman et al. | 707/3 |
| 2006/0184527 A1* | 8/2006 | Chi et al. | 707/7 |
| 2007/0156677 A1* | 7/2007 | Szabo | 707/5 |
| 2007/0214116 A1 | 9/2007 | Liu et al. | |
| 2008/0027936 A1* | 1/2008 | Liu et al. | 707/7 |

FOREIGN PATENT DOCUMENTS

EP 1653380 A1 5/2006

OTHER PUBLICATIONS

Albert, Reka and Albert-Laszlo Barabasi, "Statistical mechanics of complex networks," Reviews of Modern Physics, vol. 74, Jan. 2002, © 2002 The American Physical Society, pp. 47-97.

(Continued)

*Primary Examiner*—Mohammad Ali
*Assistant Examiner*—John P Hocker
(74) *Attorney, Agent, or Firm*—Perkins Coie LLP (57) ABSTRACT

A method and system for determining a ranking of web sites based on an aggregation of rankings of the web pages within the web sites is provided. A ranking system identifies for each web site a stationary distribution of a stochastic complement of the transition probabilities between web pages of the web site. The ranking system then calculates transition probabilities between web sites based on the web page transition probabilities weighted by the stationary distribution of the stochastic complements. The ranking system then calculates the stationary distribution of the transition probabilities of the web sites to represent a ranking of the web sites.

12 Claims, 6 Drawing Sheets

OTHER PUBLICATIONS

Amitay, Einat, et al., "Topic Distillation with Knowledge Agents," 11th TREC, 2002, 10 pages.
Arasu, Arvind et al., "PageRank Computation and the Structure of the Web: Experiments and Algorithms," Technical Report, IBM Almaden Research Center, Nov. 2001, 5 pages.
Baeza-Yates, R. and B. Ribeiro-Neto, "Chapter 2 Modeling and Chapter 3 Retrieval Evaluation," Modern Information Retrieval, © 1999 by the ACM Press, pp. 19-97.
Bharat, Krishna and George A. Mihaila, "When Experts Agree: Using Non-Affiliated Experts to Rank Popular Topics," WWW10, Hong Kong, pp. 597-602.
Bharat, Krishna and Monika R. Henzinger, "Improved Algorithms for Topic Distillation in a Hyperlinked Environment," SIGIR'98, Melbourne, Australia, ACM 1998, 9 pages.
Bharat, Krishna et al., "Who Links to Whom: Mining Linkage between Web Sites," In Proceedings of the IEEE International Conference on Data Mining (ICDM'01), San Jose, California, Nov. 2001, 8 pages.
Broder, Andrei, "A taxonomy of web search," SIGIR Forum 36(2), 2002, 8 pages.
U.S. Appl. No. 11/293,044, Bragdon.
U.S. Appl. No. 11/375,612, Liu et al.
Chakrabarti, Soumen, "Integrating the Document Object Model with Hyperlinks for Enhanced Topic Distillation and Information Extraction," WWW10, May 2001, Hong Kong, pp. 211-220.
Chakrabarti, Soumen, Mukul Joshi and Vivek Tawde, "Enhanced Topic Distillation using Text, Markup Tags, and Hyperlinks," SIGIR'01, New Orleans, Louisiana, ACM 2001, 9 pages.
Cho, Grace E. and Carl D. Meyer, "Aggregation /Disaggregation Methods of Nearly Uncoupled Markov Chains," Nov. 24, 1999, Department of Mathematics, North Carolina State University, 12 pages.
Craswell, Nick and David Hawking, "Overview of the TREC 2003 Web Track," 12th TREC 2003, Mar. 22, 2004, pp. 1-15.
Davulcu, Hasan et al., "OntoMiner: Bootstrapping Ontologies From Overlapping Domain Specific Web sites," WWW2004, May 2004, New York, ACM, 2 pages.
Despeyroux, Thierry, "Practical Semantic Analysis of Web Sites and Documents," WWW2004, May 2004, New York, ACM, pp. 685-693.
Dill, Stephen et al., "Self-Similarity In the Web," ACM Transactions on Internet Technology, vol. 2, No. 3, Aug. 2002, © 2002 ACM, pp. 205-223.
Dwork, Cynthia et al., "Rank Aggregation Methods for the Web," WWW10, May 2001, Hong Kong, ACM, pp. 613-622.
Eiron, Nadav et al., "Ranking the Web Frontier," WWW2004, May 2004, New York, ACM, pp. 309-318.
Girvan, Michelle and M. E. J. Newman, "Community structure in social and biological networks," Dec. 7, 2001, Proc. Natl. Acad. Sci. USA, 2002, pp. 7821-7826.
Google, http://www.google.com, 1 page, [last accessed Jan. 26, 2007].
Hawking, David, "Overview of the TREC-9 Web Track," 9th TREC, 2000, Sep. 4, 2001, pp. 1-16.
Henzinger, Monika R. et al., "Challenges in Web Search Engines," Sep. 3, 2002, In Proceedings of the 18th International Joint Conference on Artificial Intelligence, 2003, 12 pages.
Kamvar, Sepandar D. et al., "Extrapolation Methods for Accelerating PageRank Computations," WWW2003, May, Budapest, Hungary, ACM, 10 pages.
Kamvar, Sepandar, D. et al., "Exploiting the Block Structure of the Web for Computing PageRank," Stanford University Technical Report, Copyright 2003, 13 pages.
Kleinberg, Jon M., "Authoritative Sources in a Hyperlinked Environment," Journal of the ACM, vol. 46, No. 5, 1999, 34 pages.
Langville, Amy N. and Carl D. Meyer, "Deeper Inside PageRank," Jul. 6, 2004, Internet Mathematics, vol. 1, No. 3, © A K Peters, Ltd., pp. 335-380.
Lei, Yuangui et al., "Modelling Data-Intensive Web Sites with OntoWeaver," In Proceedings of International Workshop on Web Information Systems Modeling, Riga, Latvia, Jun. 2004, 16 pages.
Lerman, Kristina et al., "Using the Structure of Web Sites for Automatic Segmentation of Tables," SIGMOD 2004, Paris, France, © 2004 ACM, 12 pages.
Meghabghab, George, "Google's Web Page Ranking Applied to Different Topological Web Graph Structures," Jan. 2, 2001, Journal of the American Society for Information Science and Technology, 52(9), Jul. 2001, © 2001 by John Wiley & Sons, Inc., pp. 736-747.
Meyer, C. D., "Stochastic Complementation, Uncoupling Markov Chains, and the Theory of Nearly Reducible Systems," Feb. 2, 1989, SIAM Review, 31 (1989), 34 pages.
NetCraft, http://www.netcraft.com, 6 pages, [last accessed Jan. 26, 2007].
Page, L., S. Brin, R. Motwani and T. Winograd, "The PageRank Citation Ranking: Bringing Order to the Web," Jan. 29, 1998, Stanford University Technical Report, 17 pages.
Qin, Tao et al., "Subsite Retrieval: A Novel Concept for Topic Distillation," G.G. Lee et al. (Eds.), AIRS 2005, LNCS 3689, 2005, © Springer-Verlag Berlin Heidelberg 2005, pp. 388-400.
ResearchBuzz!, "Google Celebrates 7, Where Did the 8 Go?," Sep. 27, 2005, http://www.researchbuzz.org/2005/09/google_celebrates_7_where_did.shtml.
Robertson, S.E. and K. Sparck Jones, "Relevance Weighting of Search Terms," Journal of the American Society for Information Science, vol. 27, No. 3, May-Jun. 1976, pp. 129-146.
Robertson, S.E., "Overview of the Okapi Projects," Journal of Documentation, vol. 53, No. 1, Jan. 1997, pp. 3-7.
Shakery, Azadeh and ChengXiang Zhai, "Relevance Propagation for Topic Distillation UIUC TREC-2003 Web Track Experiments," 12th TREC, 2003, pp. 1-5.
TREC-2004 Web Track Guidelines, Updated Jul. 16, 2004 (7 pages).
Wang, Jidong et al., "ReCoM: Reinforcement Clustering of Multi-Type Interrelated Data Objects," SIGIR'03, Toronto, Canada, © 2003 ACM, 8 pages.
Wang, Yuan and David J. DeWitt, "Computing PageRank in a Distributed Internet Search System," Proceedings of the 30th VLDB Conference, Toronto, Canada, 2004, pp. 420-431.
Wu, Jie and Karl Aberer, "Using SiteRank for Decentralized Computation of Web Document Ranking," AH 2004, LNCS 3137, 2004, © Springer-Verlag Berlin Heidelberg 2004, pp. 265-274.
Wu, Jie and Karl Aberer, "Using SiteRank for P2P Web Retrieval," Mar. 24, 2004, EPFL Technical Report ID: IC/2004/31, 20 pages.
Yu, Shipeng et al., "Improving Pseudo-Relevance Feedback in Web Information Retrieval Using Web Page Segmentation," WWW2003, May 2003, Budapest Hungary, ACM, 11 pages.
Stewart, William J., "Chapter 6.2—Stochastic Complementation," Introduction to the Numerical Solution of Markov Chains, copyright 1994 by Princeton University Press, pp. 294-307.
U.S. Appl. No. 12/505,436, filed Jul. 17, 2009, Liu et al.

* cited by examiner

RANKING OF WEB SITES BY AGGREGATING WEB PAGE RANKS

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Three well-known techniques for page ranking are PageRank, HITS ("Hyperlinked-Induced Topic Search"), and DirectHIT. PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by adjacency matrix A, where $A_{ij}$ represents the number of outgoing links from web page i to web page j. The importance score $w_j$ for web page j can be represented by the following equation:

$$w_j = \sum_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the result as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q) \text{ and } h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

Since web sites are a primary organizational structure of the web, many web applications attempt to rank web sites based on their importance. For example, a search engine service may factor in the rank of a web site into the ranking of web pages of that web site. In particular, a web page of a highly ranked web site should be ranked higher than a web page of a less highly ranked web site, assuming all other features of the web pages are equal. Web sites have been ranked using web page ranking techniques that are applied to web sites. Typically, the web sites are represented as a web graph with web sites represented as vertices of the graph and links between web pages of the web sites represented as edges between the vertices. A web graph can be represented as an adjacency matrix as described above and a web page ranking algorithm can be applied to the adjacency matrix to generate a ranking of the web sites. Unfortunately, such an approach to ranking web sites results in a ranking that many times does not reflect the relative importance of the web sites.

SUMMARY

A method and system for determining a ranking of web sites based on an aggregation of rankings of the web pages within the web sites is provided. A ranking system is provided with transition probabilities between web pages of web sites. The ranking system identifies for each web site a stationary distribution of a stochastic complement of the transition probabilities between web pages of the web site. Because it can be computationally complex to generate the stochastic complement, the ranking system may approximate the stochastic complement as described below. The ranking system then calculates transition probabilities between web sites based on the web page transition probabilities weighted by the stationary distribution of the stochastic complements. The ranking system may store the transition probabilities in a "coupling" matrix. The ranking system then calculates the stationary distribution of the coupling matrix. The stationary distribution of the coupling matrix represents a ranking of the web sites.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for determining a ranking of web sites based on an aggregation of rankings of the web pages within the web sites is provided. In one embodiment, a ranking system is provided with transition probabilities between web pages of web sites. A transition probability between two web pages represents the probability that a user who is visiting one web page will next visit the other web page. The ranking system represents the transition probabilities using a square matrix with the rows and columns representing web pages. The ranking system identifies for each web site a stationary distribution of a stochastic complement of the transition probabilities between web pages of the web site. The stochastic complement for a web site reflects an aggregation of the probability mass of the transition probabilities of inter-site transitions (i.e., transitions between web pages of different web sites) to intra-site transitions (i.e., transitions between web pages of the same web site). The stochastic complement has the characteristic that its stationary distribution is the same as the stationary distribution for the web site calculated from the transition probabilities of the web pages. Because it can be computationally complex to generate the stochastic complement, the ranking system may approximate the stochastic complement as described below. The stationary distribution for a web site contains a stationary probability for each web page of the web site. The ranking system then calculates transition probabilities between web sites based on the web page transition probabilities weighted by the stationary distribution of the stochastic complements. The ranking system may store the transition probabilities in a "coupling" matrix. The transition probability between two web sites represents the probability that a user who is visiting a web page of one of the web sites will next visit a web page of the other web site. The ranking system then calculates the stationary distribution of the coupling matrix, which gives a stationary probability of a user visiting the web site. The stationary distribution of the coupling matrix contains a stationary probability for each web site. The ranking system then generates a ranking of the web sites based on their stationary distribution. In this way, the ranking system generates a ranking of web sites that is based on transition probabilities of web pages of the web site without having to calculate a ranking of the web pages, as described below.

Figure 1:
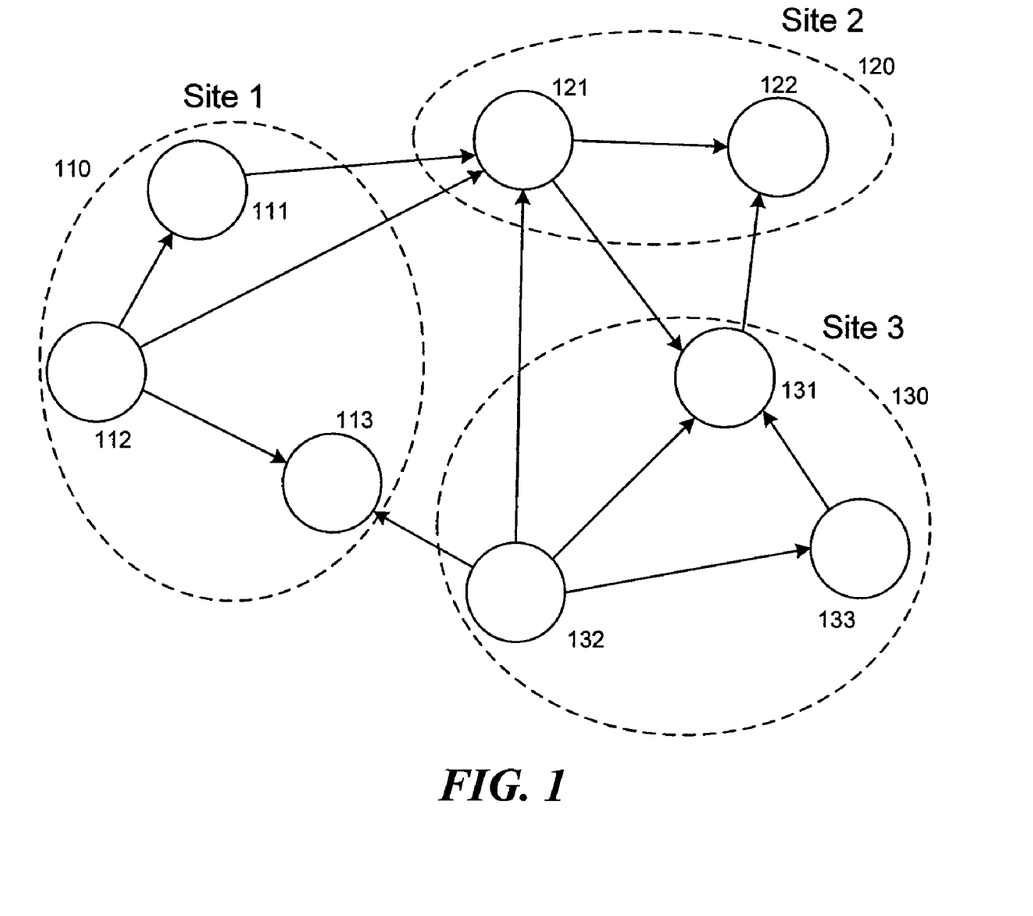
FIG. 1 illustrates an example of a web page graph representing a collection of web sites.

FIG. 1 illustrates an example of a web page graph representing a collection of web sites. The web page graph represents web pages of three web sites 110, 120, and 130. The web pages are represented as nodes of the web page graph. Web site 110 has web pages represented as nodes 111, 112, and 113; web site 120 has web pages represented as nodes 121 and 122; and web site 130 has web pages represented as nodes 131, 132, and 133. The edges between the nodes represent outgoing links of web pages. For example, the edge between node 112 and node 111 represents that the web page corresponding to node 112 has a link to the web page corresponding to node 111. The links between web pages of the same web site are referred to as intra-site links, and links between web pages of different web sites are referred to as inter-site links. For example, the edge between nodes 112 and 111 represents an intra-site link, while the edge between nodes 112 and 121 represents an inter-site link.

Web page ranking algorithms typically assume a user's visit of web pages can be represented by a random walk over web pages. A random walk assumes that, when a user is visiting a web page, the user randomly selects a link of that web page to visit the next web page. To rank web sites rather than web pages, a random walk model could be applied to the web sites. Each web site could be represented as a node of a web site graph and each inter-site link could be represented as an edge between nodes. A page ranking algorithm could then be applied to the web site graph to generate a ranking of the web sites in much the same way as a page ranking algorithm is applied to a web page graph to generate a ranking of web pages. A random walk, however, is not a particularly accurate model for web site transitions. In particular, even if there are links between two web sites, when a user visits a web page of one site, that web page may not contain a link to the other web site and thus the other web site cannot currently be visited. Thus, a web site graph is only an approximation of the transition probabilities of the web sites. As a result, the web site ranking derived from such an approximation is not particularly accurate.

A more accurate representation of the ranking of web sites can be derived from the ranking of web pages of the web sites. Although it can be demonstrated that the sum of the ranks of web pages (e.g., calculated using a PageRank algorithm) is equal to the probability of visiting the web site, the calculation of the ranks of web pages is very computationally complex. The computational complexity results from the large number of web pages, which has been reported to be in the range of tens of billions. The number of web sites, in contrast, has been reported to be only in the range of tens of millions. Therefore, it is much more complex, albeit more accurate, to rank web sites based on ranking of their web pages rather than to rank web sites directly using a web site graph as describe above.

The ranking system ranks web sites using a divide and conquer technique. The ranking system calculates a stationary distribution of an approximated stochastic complement matrix for each web site. Thus, millions of stationary distributions are calculated. However, since each web site has only a relatively few number of web pages, each calculation such stationary distributions is computationally inexpensive. However, the calculation of the stochastic complements can be expensive, which is why the ranking system, in some embodiments, uses an approximation of the stochastic complement. The ranking system then calculates a transition probability for each pair of web sites using the stationary distributions of the stochastic complements. Finally, the transition system calculates the stationary distribution of the transition probabilities of the web sites, which gives a ranking of the web sites. Since the transition probabilities of the web sites can be represented in a square matrix of the web sites, the computational complexity in calculating the stationary distribution of the web site graph is orders of magnitude less than calculating the stationary distribution of a web page graph.

The random visiting of web pages is referred to as the "random surfer model." The random surfer model can be described with a Markov chain $\{X_k\}k \geq 0$ whose state space is the set of the web pages. The current state of the Markov chain is state $P_l$ if and only if the random surfer is staying at the lth page at the current time. The evolution of the Markov chain represents the surfing behavior of the random surfer from one web page to another. If there is a link from page i to page j, the probability of transitioning from state $P_i$ to state $P_j$ is represented by the following equation:

$$p_{ij} = \alpha \cdot \frac{1}{d_i} + (1-\alpha) \cdot \frac{1}{n} \quad (1)$$

Otherwise, the probability is represented by the following equation:

$$p_{ij} = (1-\alpha) \cdot \frac{1}{n} \quad (2)$$

where $p_{ij}$ represents the probability of transitioning from web page i to web page j, n represents the number of web pages, $d_i$ represents the number of links of web page i to other web pages, and $\alpha$ represents a weighting factor. The transition probability matrix of the surfing Markov chain is represented by $P(\alpha)=(p_{ij}(\alpha))$. The parameter $\alpha$, usually set to 0.85, is called the damping factor, which represents the probability of visiting a web page via a link from another web page. The remaining probability, $1-\alpha$, represents the probability of next visiting a web page for which the current web page does not contain a link. For example, a user can visit such a web page by entering its URL in the address line of a browser, selecting a favorites link, and so on. A page ranking algorithm (e.g., PageRank) represents the stationary distribution of this Markov chain as $\{X_k\}k \geq 0$, or the principal eigenvector of $P(\alpha)$.

The ranking system represents the transition probability matrix $P(\alpha)$ as an n×n transition probability matrix $Q(\alpha)$, which is partitioned into N×N blocks according to the following equation:

$$Q(\alpha) = \begin{pmatrix} Q_{11}(\alpha) & Q_{12}(\alpha) & \cdots & Q_{1N}(\alpha) \\ Q_{21}(\alpha) & Q_{22}(\alpha) & \cdots & Q_{2N}(\alpha) \\ \vdots & \vdots & \ddots & \vdots \\ Q_{N1}(\alpha) & Q_{N2}(\alpha) & \cdots & Q_{NN}(\alpha) \end{pmatrix} \quad (3)$$

where N represents the number of web sites, $Q_{ii}$ represents the transition probabilities between web pages of web site i, and $Q_{ij}$ where $i \neq j$ represents the transition probabilities between pages of different web sites. The ranking system represents the web pages of each web site as contiguous row and column elements. The diagonal blocks $Q_{ii}(\alpha)$ are thus square and of order $n_i$, where $n_i$ is the number of pages of web site i, and $$n = \sum_{i=1}^{N} n_i.$$

The stationary distribution $\phi(\alpha)$ of $Q(\alpha)$ is represented by the following equation:

$$\phi(\alpha)Q(\alpha)=\phi(\alpha) \text{ with } \phi(\alpha)e=1 \quad (4)$$

where e is the column vector with all elements equal to 1. If $\phi(\alpha)$ is partitioned conformably with $Q(\alpha)$, the result is represented by the following equation:

$$\phi(\alpha)=\{\phi_1(\alpha), \phi_2(\alpha), \ldots, \phi_N(\alpha)\}, \quad (5)$$

where $\phi_i(\alpha)$ represents a row vector of length $n_i$, for $i=1, \ldots, N$.

The ranking system assumes that the Markov chain $\{X_k\}k \geq 0$ is started with the stationary distribution of $\phi(\alpha)$. The one-step transition probability from $S_i$ to $S_j$ is represented by the following equation:

$$c_{ij}(\alpha)=Pr_{\phi(\alpha)}\{X_{i+1} \in S_j | X_i \in S_i\} \quad (6)$$

Based on the properties of conditional probability, $c_{ij}(\alpha)$ can be represented by the following equation:

$$c_{ij}(\alpha) = \frac{\phi_i(\alpha)}{\|\phi_i(\alpha)\|_1} Q_{ij}(\alpha)e \quad (7)$$

where $Q_{ij}(\alpha)$ is the ijth block of the one-step transition matrix $Q(\alpha)$ and $\|\cdot\|_1$ represents the sum of the absolute value of the elements of the vector. The N×N matrix $C(\alpha)=(c_{ij}(\alpha))$ is referred to as the "coupling" matrix, whose elements represent the transition probabilities between web sites. The coupling matrix is an irreducible stochastic matrix and thus has a unique stationary distribution, which can be represented by the following equation:

$$\xi(\alpha)C(\alpha)=\xi(\alpha) \text{ with } \xi(\alpha)e=1 \quad (8)$$

where $\xi(\alpha)$ represents the stationary distribution. The transition probability from $S_i$ to $S_j$ summarizes all the cases in which the random surfer jumps from any page in $S_i$ to any page in $S_j$ within any transition step. Therefore, the transitions are in accordance with the real behavior of the web surfers. As a result, the ranking calculated from the coupling matrix $C(\alpha)$ will be more accurate than those previous calculations of web site rankings.

Since the generation of the coupling matrix using a page ranking algorithm applied to all the web pages is very computationally complex, the ranking system avoids this complexity by using a modified coupling matrix. The ranking system uses stochastic complements to approximate $C(\alpha)$ without the computational complexity of a page ranking algorithm. This approximation is illustrated by an example that includes only two web sites. The transition probability matrix for the web pages of the web sites is represented by the following equation:

$$Q(\alpha) = \begin{pmatrix} Q_{11}(\alpha) & Q_{12}(\alpha) \\ Q_{21}(\alpha) & Q_{22}(\alpha) \end{pmatrix} \quad (9)$$

The stationary distribution is represented as $\phi(\alpha)=\{\phi_1(\alpha), \phi_2(\alpha)\}$. The ranking system calculates the stochastic complement for each diagonal block in $Q(\alpha)$. For example, the stochastic complement of $Q_{11}(\alpha)$ is represented by the following equation:

$$S_{11}(\alpha)=Q_{11}(\alpha)+Q_{12}(\alpha)(1-Q_{22}(\alpha))^{-1}Q_{21}(\alpha) \quad (10)$$

The stochastic complement is also a stochastic matrix in which the sum of the elements of each row is 1. The unique stationary distribution for the stochastic complement $S_{11}(\alpha)$ can be represented by the following equation:

$$\frac{\phi_i(\alpha)}{\|\phi_i(\alpha)\|_1} S_{11}(\alpha) = \frac{\phi_i(\alpha)}{\|\phi_i(\alpha)\|_1} \quad (11)$$

with $$\frac{\phi_i(\alpha)}{\|\phi_i(\alpha)\|_1} e = 1$$

Generally, $\phi_i(\alpha)/\|\phi_i(\alpha)\|_1$ is the unique stationary distribution for the stochastic complement $S_{ij}(\alpha)$, as represented by the following equation:

$$\frac{\phi_i(\alpha)}{\|\phi_i(\alpha)\|_1} S_{ii}(\alpha) = \frac{\phi_i(\alpha)}{\|\phi_i(\alpha)\|_1} \quad (12)$$

with $$\frac{\phi_i(\alpha)}{\|\phi_i(\alpha)\|_1} e = 1$$

As discussed above, the computation of the stationary distribution of each $S_{ij}(\alpha)$ will be less computationally expensive than the computation of a page rank directly because the dimension of each $S_{ij}(\alpha)$ is very small and equal to the number of pages of the web site. However, it can be computationally complex to compute the exact stochastic complement since it involves the computing of a contradict matrix for $1-Q_{ii}(\alpha)$. To avoid this computational complexity, the ranking system approximates the stochastic complement. In particular, the ranking system modifies each diagonal block $Q_{ii}(\alpha)$ by a little to get a new matrix with the same dimension as $S_{ij}(\alpha)$ that is also a stochastic matrix. The ranking system initially modifies the original diagonal block $Q_{ii}(\alpha)$ to be a transition probability matrix. Since the sum of each row in the original diagonal block $Q_{ii}(\alpha)$ is always less than 1, the ranking system adjusts the diagonal elements of $Q_{ii}(\alpha)$ to make the sum of each row equal to 1 and represents the adjusted matrix as $Q_{ii}^*(\alpha)$. The ranking system could alternatively distribute the adjustment to other elements of the rows. The ranking system represents the stationary distribution by the following equation:

$$u_i(\alpha)Q_{ii}^*(\alpha)=u_i(\alpha) \text{ with } u_i(\alpha)e=1 \quad (13)$$

where $u_i(\alpha)$ represents the stationary distribution and an approximation as represented by the following equation:

$$\frac{\phi_i(\alpha)}{\|\phi_i(\alpha)\|_1} \approx \frac{u_i(\alpha)}{\|u_i(\alpha)\|_1} \quad (14)$$

The ranking system thus represents the approximated coupling matrix by the following equation:

$$(C^*(\alpha))_{ij} = \frac{u_i(\alpha)}{\|u_i(\alpha)\|_1} Q_{ij}(\alpha)e \quad (15)$$

The ranking system then calculates the stationary distribution or $\xi^*(\alpha)$ of the approximated coupling matrix as an approximation to $\xi(\alpha)$.

Figure 2:
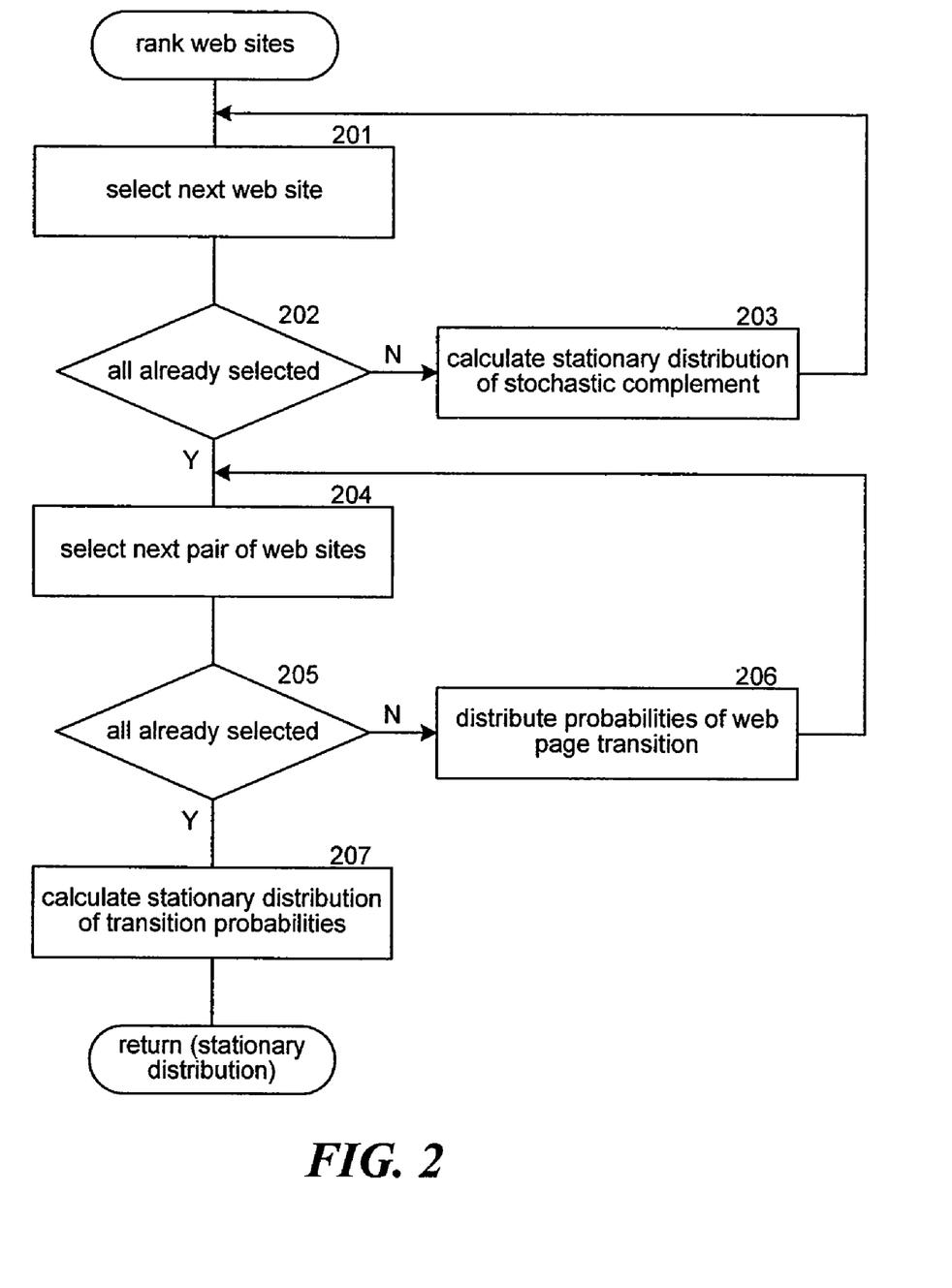
FIG. 2 is a flow diagram that illustrates high-level processing of a rank web sites component of the ranking system in one embodiment.

FIG. 2 is a flow diagram that illustrates high-level processing of a rank web sites component of the ranking system in one embodiment. The component is provided a transition probability matrix for the web pages of the web sites, which may be generated from an adjacency matrix using Equations 1 and 2. In blocks 201-203, the component calculates the stationary distribution of the stochastic complements for each web site. In block 201, the component selects the next web site. In decision block 202, if all the web sites have already been selected, then the component continues at block 204, else the component continues at block 203. In block 203, the component generates an approximation of the stochastic complement matrix for the selected web site. The component then calculates the stationary distribution for the stochastic complement matrix by calculating the principal eigenvector of the matrix. The component then continues at block 201 to select the next web site. In blocks 204-206, the component calculates the transition probabilities for each pair of web sites based on the calculated stationary distribution. In block 204, the component selects the next pair of web sites. In decision block 205, if all the pairs of web sites have already been selected, then the component continues at block 207, else the component continues at block 206. In block 206, the component distributes the transition probabilities for the web pages to the selected pair of web sites using the calculated stationary distribution for one of the web sites of the pair. The component then loops to block 204 to select the next pair of web sites. In block 207, the component calculates the stationary distribution of the transition probabilities of the web sites by calculating the principal eigenvector of a matrix of the transition probabilities. The component then returns the stationary distribution as a ranking of the web sites.

Figure 3:
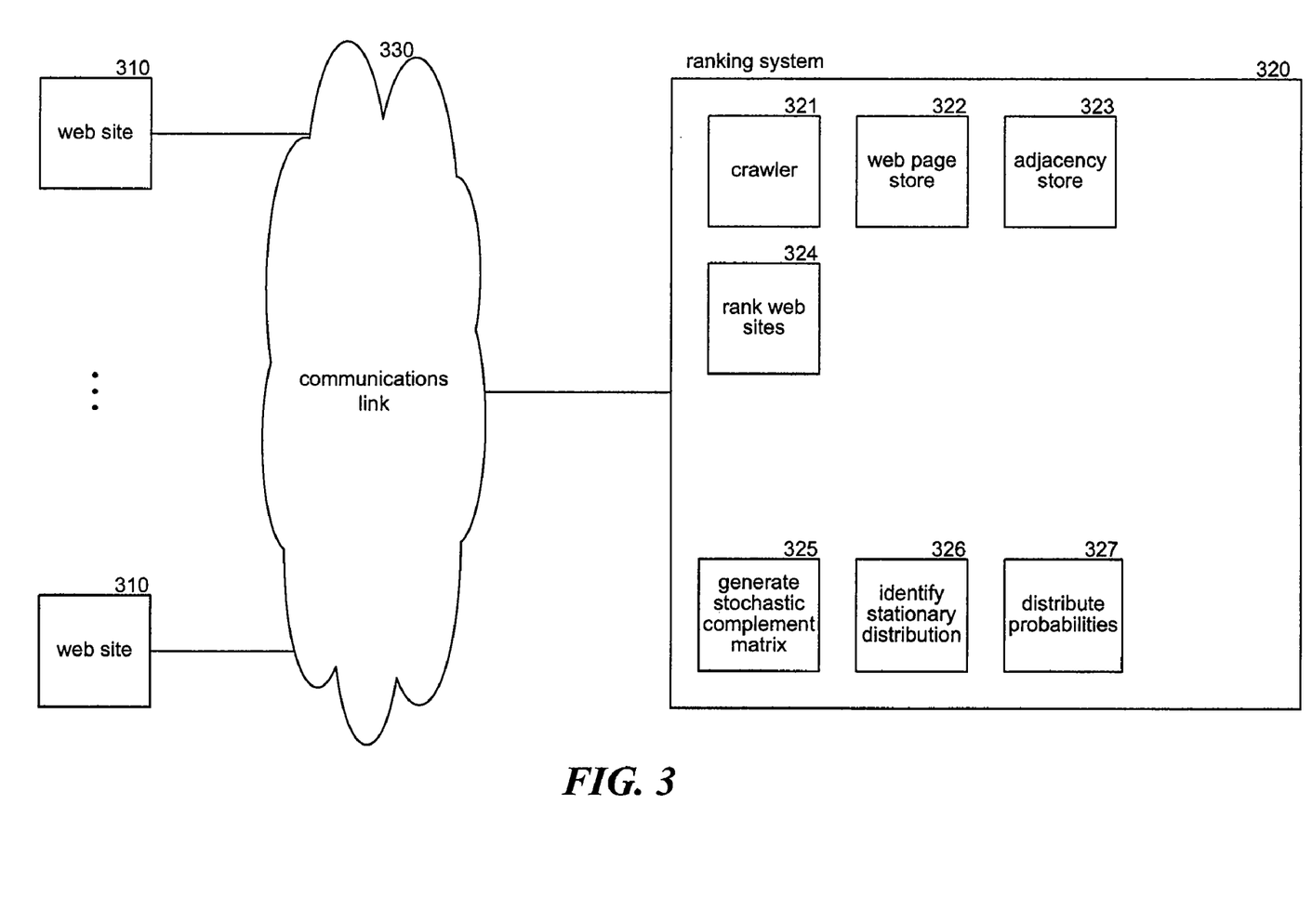
FIG. 3 is a block diagram illustrating components of the ranking system in one embodiment.

FIG. 3 is a block diagram illustrating components of the ranking system in one embodiment. The ranking system 320 is connected to various web sites 310 via communications link 330. The ranking system may include a crawler component 321, a web page store 322, and an adjacency store 323. The crawler component may crawl the web sites to identify web pages of the web sites and store the information in the web page store. The crawler component may also create an adjacency matrix for the web pages that is stored in the adjacency store. The ranking system may generate the transition probability matrix from the adjacency matrix. The ranking system also includes a rank web sites component 324, a generate stochastic complement matrix component 325, an identify stationary distribution component 326, and a distribute probabilities component 327. The rank web sites component invokes the generate stochastic complement matrix component to generate the stochastic complement matrix for each web site. The rank web sites component invokes the identify stationary distribution component to calculate the stationary distributions for each stochastic complement matrix. The rank web sites component then invokes the distribute probabilities component to generate the transition probabilities for the web sites based on the stationary distributions of the stochastic complement matrices. The rank web sites component invokes the identify stationary distribution component to identify the stationary probability for each web site based on the generated transition probabilities of the web sites.

The computing devices on which the ranking system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the ranking system. In addition, the data structures and message structures may be stored or transmitted via a data transmission medium, such as a signal on a communications link. Various communications links may be used, such as the Internet, a local area network, a wide area network, or a point-to-point dial-up connection.

The ranking system may be implemented on various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the ranking system may not include a crawler or a search engine.

Figure 4:
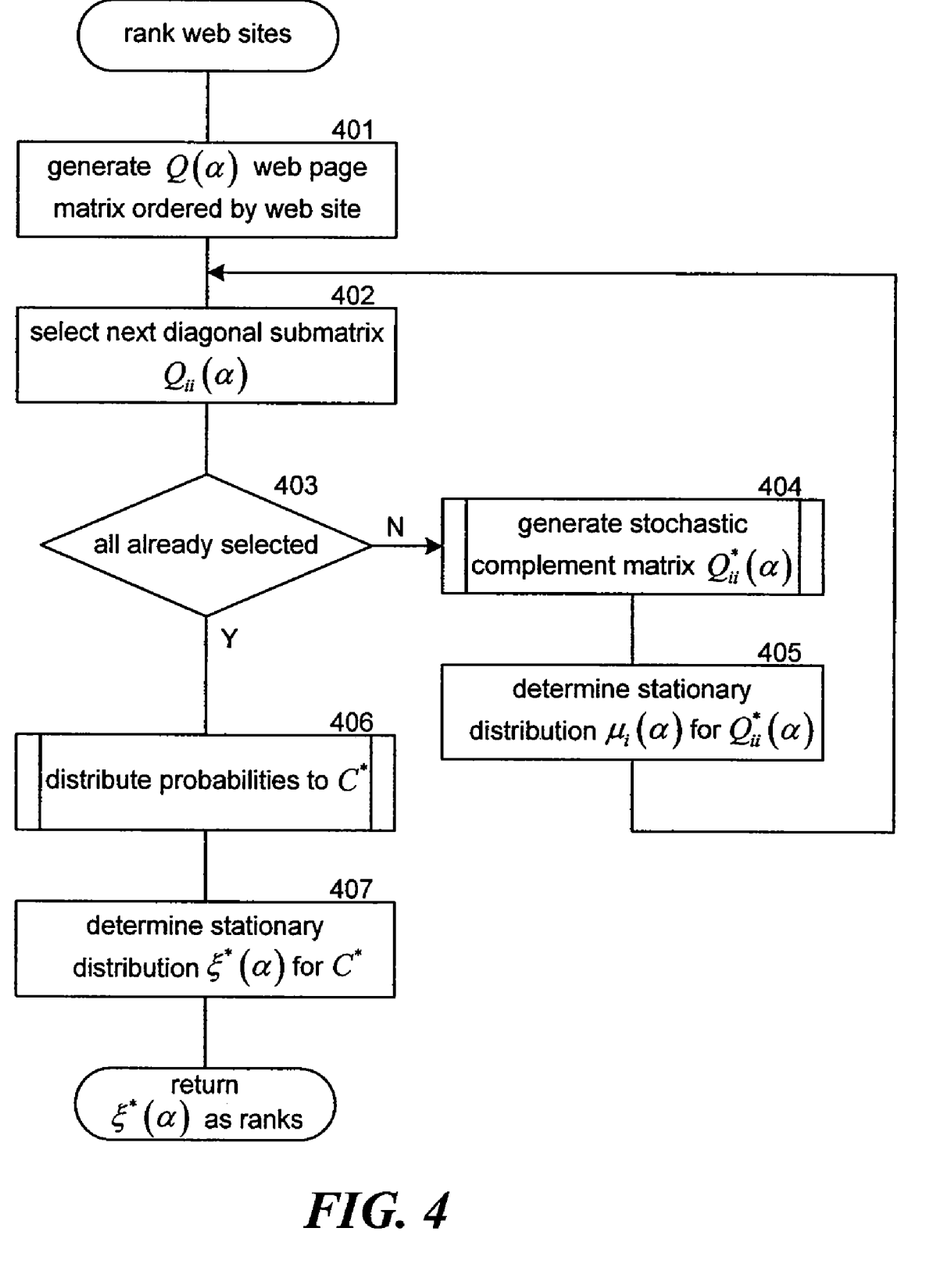
FIG. 4 is a flow diagram that illustrates low-level processing of the rank web sites component of the ranking system in one embodiment.

FIG. 4 is a flow diagram that illustrates low-level processing of the rank web sites component of the ranking system in one embodiment. In block 401, the component generates a web page transition probability matrix in which the web pages for each web site are contiguous elements of the rows and columns. In blocks 402-405, the component loops identifying a stationary distribution for the stochastic complement associated with each web site. In block 402, the component selects the next diagonal submatrix of the transition probability matrix. In decision block 403, if all the diagonals of matrices have already been selected, then the component continues at block 406, else the component continues at block 404. In block 404, the component invokes the generate stochastic complement component to approximate the stochastic complement for the selected submatrix. In block 405, the component calculates the principal eigenvector for the generated stochastic complement matrix to represent the stationary distribution. The component then loops to block 402 to select the next diagonal submatrix. In block 406, the component invokes the distribute probabilities component to distribute the transition probabilities to the web sites. In block 407, the component calculates the principal eigenvector for the generated transition probability matrix of the web site as the stationary distribution. The component then returns the stationary distribution as the ranking of the web sites.

Figure 5:
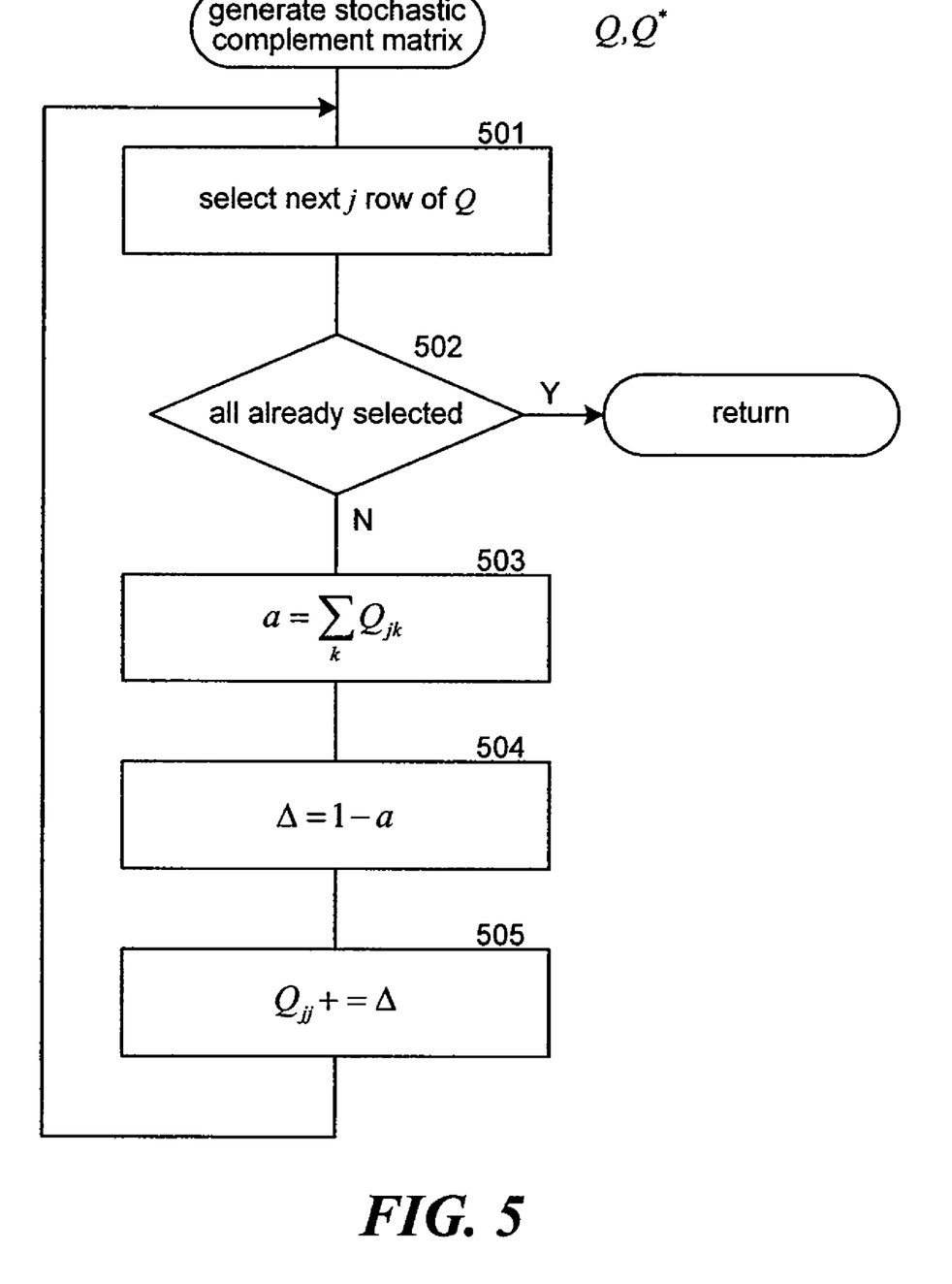
FIG. 5 is a flow diagram that illustrates the processing of the generate stochastic complement matrix component of the ranking system in one embodiment.

FIG. 5 is a flow diagram that illustrates the processing of the generate stochastic complement matrix component of the ranking system in one embodiment. The component approximates a stochastic complement for the passed matrix by adjusting the diagonal elements of each row of the matrix so that the sum of the elements in each row equals one. In block 501, the component selects the next row of the passed matrix. In decision block 502, if all the rows have already been selected, then the component returns, else the component continues at block 503. In block 503, the component calculates the sum of the elements in the selected row. In block 504, the component calculates the difference between one and the sum of the elements. In block 505, the component adjusts the diagonal elements of the matrix for the selected row by the difference and then loops to block 501 to select the next row.

Figure 6:
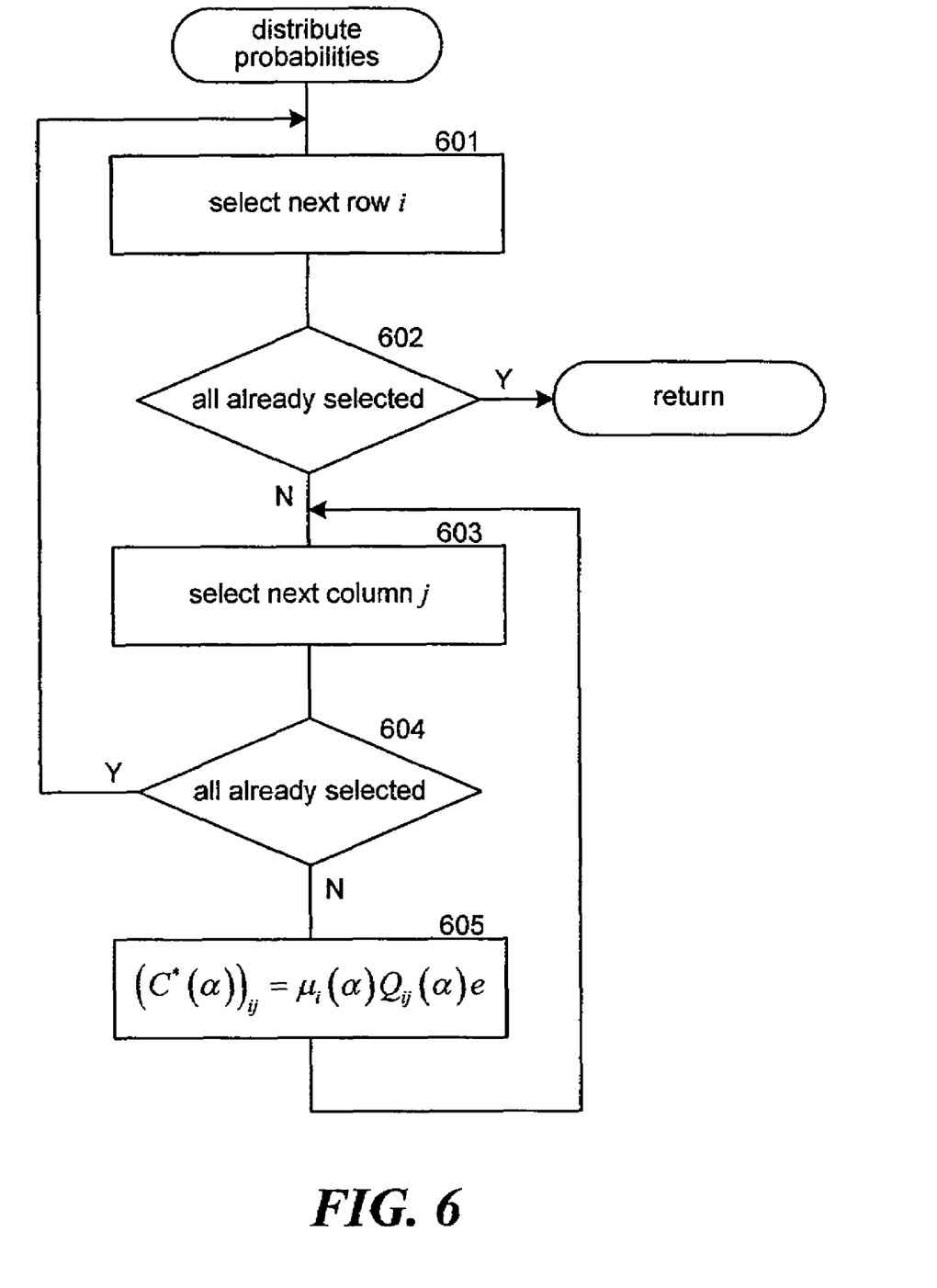
FIG. 6 is a flow diagram that illustrates the processing of the distribute probabilities component of the ranking system in one embodiment.

FIG. 6 is a flow diagram that illustrates the processing of the distribute probabilities component of the ranking system in one embodiment. The component establishes the transition probabilities of the web sites. In block 601, the component selects the next row of the coupling matrix. In decision block 602, if all the rows have already been selected, then the component returns, else the component continues at block 603. In block 603, the component selects the next column of the coupling matrix. In decision block 604, if all the columns for the selected row have already been selected, then the component loops to block 601 to select the next row, else the component continues at block 605. In block 605, the component sets the transition probability for transitioning from the web site represented by the selected row to the web site represented by the selected column in accordance with Equation 15. The component then loops to block 603 to select the next column for the selected row.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the term "site" may refer to any collection of pages, and the term "page" may refer to any content in a collection that includes inter-site and intra-site links. The content may include documents, display pages, web pages, electronic mail messages, and so on. As another example, once the transition probabilities of the web site are generated, the ranking system can use any of a variety of techniques to rank the web sites such a page ranking techniques. Accordingly, the invention is not limited except as by the appended claims.

We claim:

1. A computing system for ranking of web sites having web pages, comprising:
   a component that provides transition probabilities of a user transitioning from each web page to each other web page, the transition probability matrix being partitioned into N×N blocks, where N is the number of web sites;
   a component that, for each web site, identifies a stationary probability derived from a stochastic complement of the provided transition probabilities of the web pages of the web site, the stochastic complement being represented using an approximate stochastic complement matrix that is an approximation of a stochastic complement matrix based on the provided transition probabilities of a user transitioning from each web page of the web site to each other web page of the web site, the stochastic complement matrix being a stochastic matrix, having diagonal blocks to which a probability mass of off-diagonal blocks of the transition probability matrix are distributed, and having a characteristic that a stationary distribution for the web site calculated from the stochastic complement matrix is the same as that calculated from the transition probability matrix;

a component that generates for each pair of web sites, a transition probability of a user transitioning from a first web site of the pair to a second web site of the pair based on the identified stationary probabilities derived from the stochastic complements and the provided transition probabilities;

a component that, for each web site, identifies from the generated transition probabilities a stationary probability indicating a likelihood that the web site will be visited during a visit to the web sites; and a component that provides a ranking of the web sites based on the stationary probabilities of the web sites wherein the ranking of the web sites is derived from the stationary probabilities of the web pages of the web sites.

2. The computing system of claim 1, wherein the component that generates a transition probability for each pair of web sites generates a coupling matrix by calculating for each combination of a first web site and a second web site a probability of transitioning from the first web site to the second web site by multiplying the stationary distribution of the first web site times the provided transition probabilities of transitioning from each web page of the first web site to the each web page of the second web site times a unit vector.

3. The computing system of claim 2 wherein the component that identifies a stationary probability for each web site identifies a stationary distribution of the generated coupling matrix.

4. The computing system of claim 1 wherein the component that generates a transition probability for each pair of web sites generates a coupling matrix based on a stationary distribution for the stochastic complement matrix and the provided probabilities.

5. The computing system of claim 4 wherein the component that identifies a stationary probability for each web site identifies a stationary distribution for the coupling matrix.

6. A computing system for ranking of a number of web sites having web pages, comprising:

a component that provides a transition probability matrix with transition probabilities of a user transitioning from web page to web page, the transition probability matrix being partitioned into N×N blocks, where N is the number of web sites;

a component that, for each web site,
creates an approximate stochastic complement matrix that is an approximation of a stochastic complement matrix based on the provided transition probabilities of a user transitioning from each web page of the web site to each other web page of the web site, the stochastic complement matrix being a stochastic matrix, having diagonal blocks to which a probability mass of off-diagonal blocks of the transition probability matrix are distributed, and having a characteristic that a stationary distribution for the web site calculated from the stochastic complement matrix is the same as that calculated from the transition probability matrix; and
identifies a stationary distribution of the created approximate stochastic complement matrix for the web site;

a component that generates a coupling matrix by calculating for each combination of a first web site and a second web site a transition probability of transitioning from the first web site to the second web site based on the identified stationary distribution of the created approximate stochastic complement matrix and the provided transition probabilities of transitioning from web pages of the first web site to web pages of the second web site;

a component that identifies a stationary distribution of the generated coupling matrix; and a component that provides a ranking of the web sites based on the identified stationary distribution of the generated coupling matrix.

7. The computing system of claim 6 wherein the creation of the approximate stochastic complement matrix for each web site includes setting the elements of the approximate stochastic complement matrix to the provided probabilities adjusted so that elements for each row of the matrix sum to one.

8. The computing system of claim 6 wherein the component that identifies a stationary distribution of the approximate stochastic complement matrix identifies the stationary distribution according to the following formula:

$$u(\alpha)Q_{ii}^*(\alpha) = u_i(\alpha) \text{ with } u_i(\alpha)e = 1$$

where $u_i$ represents the stationary distribution of web pages of i and $Q_{ii}^*$ represents an approximation of the stochastic complement matrix for web site i.

9. The computing system of claim 8 wherein the component that generates the coupling matrix generates the coupling matrix based on the following formula:

$$(\_i\ C^*(\alpha))_{ij} = u_i(\alpha)Q_{ij}(\alpha)e$$

where $(C^*(\alpha))$ represents the coupling matrix and $Q_{ij}$ represents the transition probabilities of transitioning from web pages of web site i to web pages of web site j.

10. The computing system of claim 9 wherein the component that identifies a stationary distribution of the coupling matrix identifies the stationary distribution based on the following formula:

$$\xi^*(\alpha)C^*(\alpha) = \xi^*(\alpha) \text{ with } \xi^*(\alpha)e = 1$$

where $\xi^*$ represents the stationary distribution of the web sites.

11. The computing system of claim 6 wherein the stationary distribution is calculated as an eigenvector.

12. A computer-readable storage medium containing instructions for controlling a computing system to rank sites having pages, by a method comprising:

providing a transition probability matrix with transition probabilities of a user transitioning from page to page, the transition probability matrix being partitioned into N×N blocks, where N is the number of sites;

for each page of a site identifying a stationary probability based on a stochastic complement derived from transition probabilities of visiting pages, the stochastic complement being represented using an approximate stochastic complement matrix that is an approximation of a stochastic complement matrix based on the provided transition probabilities of a user transitioning from each page of the site to each other page of the site, the stochastic complement matrix being a stochastic matrix, having diagonal blocks to which a probability mass of off-diagonal blocks of the transition probability matrix are distributed, and having a characteristic that a stationary distribution for the site calculated from the stochastic complement matrix is the same as that calculated from the transition probability matrix;

for each pair of sites generating a transition probability of a user transitioning from a first site of the pair to a second site of the pair based on the identified stationary probabilities and the transition probabilities of visiting pages; and identifying from the generated transition probabilities a ranking of the sites.

* * * * *

UNITED STATES PATENT AND TRADEMARK OFFICE
CERTIFICATE OF CORRECTION

| | | |
|---|---|---|
| PATENT NO. | : 7,634,476 B2 | Page 1 of 1 |
| APPLICATION NO. | : 11/459869 | |
| DATED | : December 15, 2009 | |
| INVENTOR(S) | : Liu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 263 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO.        : 7,634,476 B2                                            Page 1 of 1
APPLICATION NO.   : 11/459869
DATED             : December 15, 2009
INVENTOR(S)       : Tie-Yan Liu et al.

It is certified that error appears in the above-identified patent and that said Letters Patent is hereby corrected as shown below:

In column 11, line 4, in Claim 1, after "generates" insert -- , --.

In column 12, line 17, in Claim 8, delete "$u(\alpha)Q_{ii}*(\alpha) =u_i(\alpha)$ with $u_i(\alpha)e=1$" and insert -- $u_i(\alpha)Q_{ii}^*(\alpha)=u_i(\alpha)$ with $u_i(\alpha)e=1$ --, therefor.

In column 12, line 24, in Claim 9, delete "(_i C*($\alpha$))$_{ij}$=$u_i$($\alpha$)$Q_{ij}$($\alpha$)e" and insert -- (C*($\alpha$))$_{ij}$=$u_i$($\alpha$)$Q_{ij}$($\alpha$)e --, therefor.

In column 12, line 25, in Claim 9, delete "(C*($\alpha$))" and insert -- (C*($\alpha$))$_{ij}$ --, therefor.

In column 12, line 45, in Claim 12, after "a site" insert -- , --.

In column 12, line 59, in Claim 12, after "of sites" insert -- , --.

Signed and Sealed this
First Day of February, 2011

David J. Kappos
*Director of the United States Patent and Trademark Office*